United States Patent [19]

Skarvada

[11] Patent Number: 4,562,542
[45] Date of Patent: Dec. 31, 1985

[54] MODULATOR FOR ANTI-SKID BRAKING SYSTEM

[75] Inventor: Thomas Skarvada, Granada Hills, Calif.

[73] Assignee: Crane Co., Chicago, Ill.

[21] Appl. No.: 394,484

[22] Filed: Jul. 1, 1982

Related U.S. Application Data

[63] Continuation-in-part of Ser. No. 147,386, May 7, 1980, Pat. No. 4,338,669.

[51] Int. Cl.$^4$ .......................... B60T 8/02; B60T 8/10; G06F 15/20
[52] U.S. Cl. ..................................... 364/426; 303/95; 303/109
[58] Field of Search ................ 364/426; 303/95, 97, 303/103, 106, 107, 109

[56] References Cited

U.S. PATENT DOCUMENTS

| | | | |
|---|---|---|---|
| 3,523,712 | 8/1970 | Leiber | 303/97 |
| 3,724,916 | 4/1973 | Hirzel | 303/191 |
| 3,727,992 | 4/1973 | Bowler et al. | 303/107 |
| 3,838,890 | 10/1974 | Wind | 303/107 |
| 3,842,355 | 10/1974 | Fleagle | 328/114 |
| 3,889,128 | 6/1975 | Luhdorff | 303/97 X |
| 3,951,466 | 4/1976 | Guagliami et al. | 303/97 |
| 3,953,080 | 4/1976 | Bremer | 303/107 |
| 3,964,796 | 6/1976 | Bremer | 303/107 |
| 4,068,903 | 1/1978 | Straub | 303/96 |
| 4,076,332 | 2/1978 | Taylor et al. | 303/107 X |
| 4,191,430 | 3/1980 | Reitz et al. | 303/109 |
| 4,212,499 | 7/1980 | Jones | 303/103 |
| 4,338,669 | 7/1982 | Skarvada | 364/426 |

FOREIGN PATENT DOCUMENTS

| | | |
|---|---|---|
| 2377305 | 1/1978 | France . |
| 2026637 | 2/1980 | United Kingdom . |

OTHER PUBLICATIONS

European Patent Search Report No. 39606, published Jun. 1, 1983, based on application No. 81301955.

*Primary Examiner*—Jerry Smith
*Assistant Examiner*—Clark A. Jablon
*Attorney, Agent, or Firm*—Willian Brinks Olds Hofer Gilson & Lione Ltd.

[57] ABSTRACT

An improved modulator for an anti-skid brake control system generates a modulated brake control signal as a time integral function of the difference between an input signal indicative of a braking condition and a variable threshold signal. The preferred embodiment includes a computer which stores a number of threshold signals. An appropriate one of these threshold signals is selected depending on the magnitude of the velocity of the braked wheel. Furthermore, the modulator adjusts the value of the modulated brake control signal in response to skids more severe than a preset level in a manner that varies in response to the frequency of such more severe skids.

26 Claims, 9 Drawing Figures

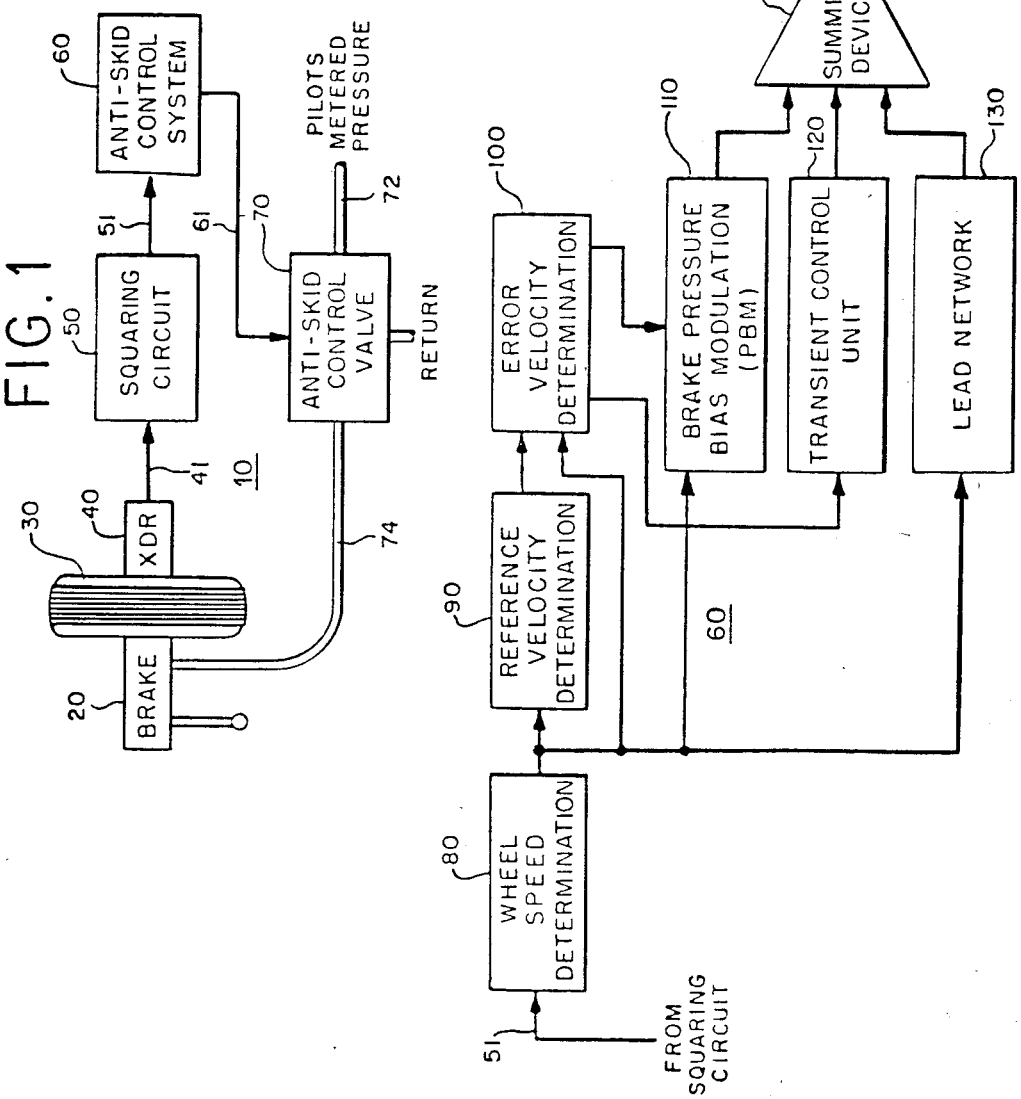

4,562,542

MODULATOR FOR ANTI-SKID BRAKING SYSTEM

IDENTIFICATION OF RELATED APPLICATION

This application is a continuation-in-part of copending application Ser. No. 147,386, filed May 7, 1980, now U.S. Pat. No. 4,338,669.

BACKGROUND OF THE INVENTION

This invention relates to an improved modulator for an anti-skid braking system.

One important class of modern anti-skid systems utilizes a modulator to provide a smoothly varying, continuous brake control signal. An early example of such systems is disclosed in U.S. Pat. No. 3,724,916, issued Apr. 3, 1973 to Edgar A. Hirzel and assigned to the assignee of the present invention. Such anti-skid systems have achieved a high level of commercial success, particularly for use with large jet transports such as the Boeing 727, 737 and 747 aircraft.

The modulators in these anti-skid systems generate a modulated brake control signal as a time integral function of an input signal indicating a braking condition. In one type of modulator, the input signal is an error signal corresponding to the difference between measured wheel velocity and a reference velocity. This error signal is related to the slip velocity between the braked wheel and the pavement. In another type of modulator, the input signal corresponds to measured wheel deceleration. In either case, the modulated brake control signal varies smoothly and continuously as a time integral function of the input signal.

In the past, such modulators have failed to provide an optimal level of flexibility and certain compromises have been necessary to design a modulator which provided the highest level of braking efficiency.

SUMMARY OF THE INVENTION

The present invention is directed to an improved modulator which provides increased flexibility and braking efficiency.

According to a first aspect of this invention, a modulator is provided with means for generating a threshold signal as a function of the velocity of the braked wheel. A rate signal is then generated as a function of both the threshold signal and the input signal discussed above, and a modulated brake control signal is generated as a time integral function of the rate signal.

An important advantage of this invention is that it allows the modulator to be adjusted for optimally aggressive braking as a function of wheel velocity. The threshold value affects braking aggressiveness: a higher threshold value allows more aggressive braking before the modulator relaxes braking effort. Thus, by providing a variable threshold which is generated as a function of wheel speed, the present invention allows the threshold to be tailored to a particular aircraft-brake-landing gear combination as a function of wheel speed. Modulator efficiency is therefore more readily optimized at one speed regardless of the threshold requirements needed to optimize performance at another speed.

According to a second aspect of this invention, a modulator is provided which varies the modulated brake control signal in response to skids more severe than a threshold level in a manner dependent on the recent frequency of more severe skids. In this way, the modulator can be designed to respond in a limited way to an isolated more severe skid and yet to respond more aggressively to rapidly recurring skids. Such a modulator prevents localized surface irregularities such as tar strips on a runway from interfering excessively with the proper operation of the modulator.

The invention itself, together with further objects and attendant advantages, will best be understood by reference to the following detailed description taken in connection with the accompanying drawings.

BRIEF DESCRIPTION OF THE DRAWINGS

FIG. 1 is a block diagram of a brake control system including an anti-skid control system.

FIG. 2 is a detailed block diagram of the functional components of the anti-skid control system of FIG. 1.

DETAILED DESCRIPTION OF A PREFERRED EMBODIMENT

Figure 3:
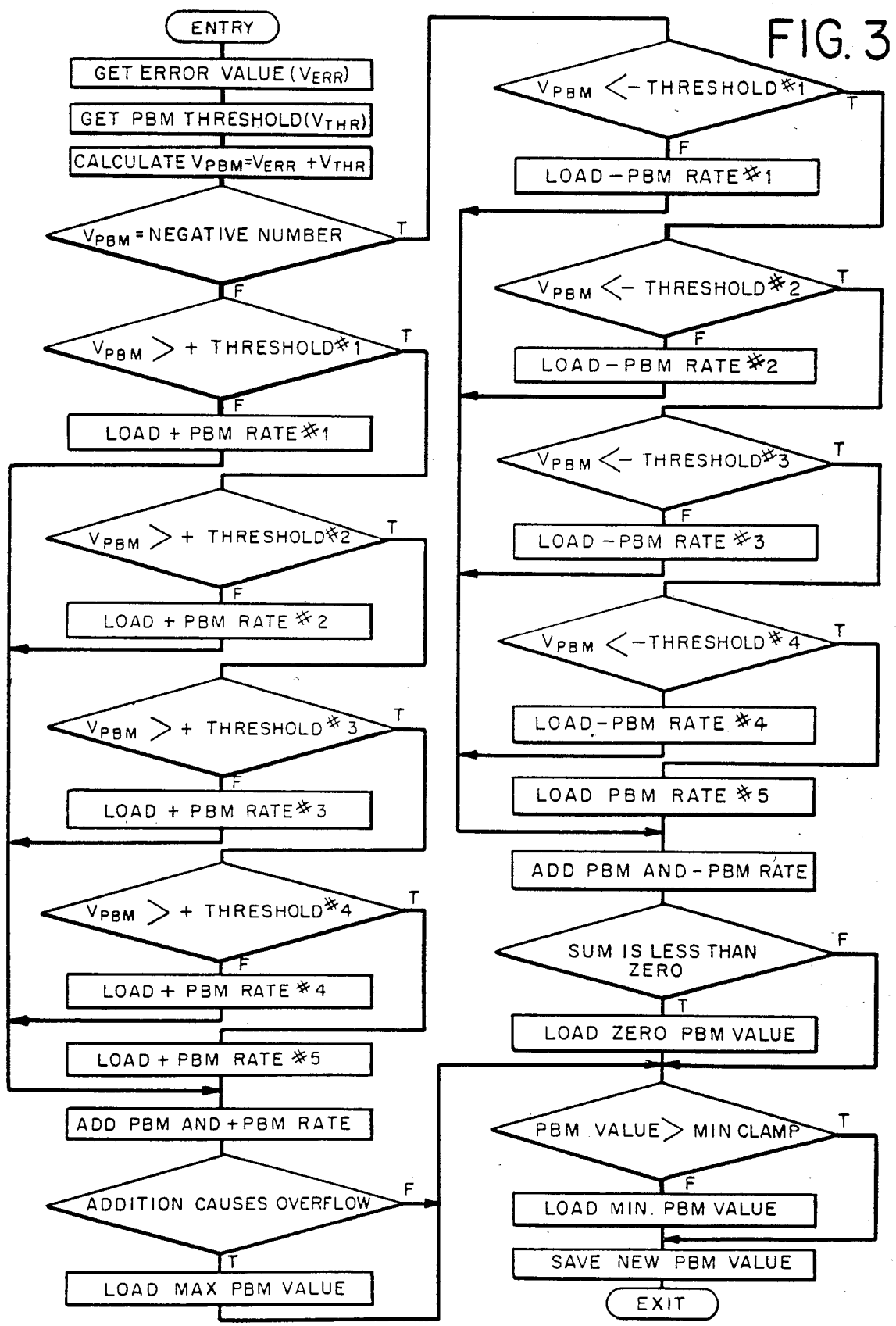
FIG. 3 is a flowchart of a portion of a first preferred embodiment of the brake pressure bias modulation (PBM) determination unit of FIG. 2.

Referring now to the drawings, preferred embodiments of the improved modulator of the present invention will be described in connection with the brake control system shown in FIGS. 1 and 2. FIG. 1 shows the major components of an anti-skid brake control system 10 which provides brake control for the brake 20 of the rotatable wheel 30. The system 10 includes a wheel speed transducer 40 which provides a sinusoidal signal on the line 41 having a frequency proportional to the angular velocity of the wheel 30. The signal on line 41 is shaped in a squaring circuit 50 and is then supplied as a wheel speed signal to an anti-skid control system 60 via line 51. The anti-skid control system 60 monitors the wheel signal on line 51. When the wheel signal indicates that the wheel 30 is about to go into a skid due to excessive braking force, the anti-skid system 60 generates a brake control signal on line 61. The anti-skid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure on the line 72 is passed by the valve 70 via the line 74 to the brake 20. However, if the metered brake pressure exceeds the skid threshold and drives the wheel 30 into a skid, the anti-skid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

FIG. 2 shows a schematic representation of the anti-skid system 60 of FIG. 1, including a wheel speed determination unit 80 which receives the wheel signal on line 51 as an input and generates an output signal representative of measured wheel speed. This wheel speed signal is supplied as an input to a reference velocity determination unit 90 for generating a reference velocity signal. This reference velocity signal is supplied as an input to an apparatus 100 for determining an error velocity signal representative of the difference between the measured wheel speed signal and the reference velocity signal. The error velocity signal is applied as an input to two separate control units: the brake pressure bias modulation (PBM) unit, or modulator 110, and the transient control unit 120. Two preferred embodiments of the modulator 110 are described in detail below in connection with FIGS. 3-9 and Tables 1-6. Here it is enough to state that the modulator 110 generates a modulated brake control signal representative of the optimum braking pressure. The modulator is smoothly, continuously modulated either to increase or to decrease the applied brake pressure to substantially prevent excessive wheel skidding while maintaining a high, effective level of braking.

Because the output of the modulator 110 varies smoothly and continuously with time, it will on occasion be unable to respond quickly enough to prevent a wheel skid. For example, when a braked wheel suddenly enters a tar strip or an ice patch or a wet surface, the braking coefficient will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the anti-skid control valve 70.

The foregoing description of the brake control system 10 is provided to set forth the environment of the preferred embodiments of the modulator of this invention. With the exception of the modulator 110, individual components of this environment do not form a part of the present invention, and for that reason will not be described in detail here. Furthermore, those skilled in the art are familiar with various forms of these components. For example, one form of the wheel speed determination unit 80, the error velocity determination unit 100, the modulator 110, and the transient control unit 120 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; in U.S. Pat. No. 4,125,295, issued Nov. 14, 1978 to Gerhard Ruhnam, et al.; and in U.S. Pat. No. 4,184,203, issued Jan. 15, 1980 to the inventor of the present invention.

FIRST PREFERRED EMBODIMENT

The present invention is directed to an improved modulator for a brake control system. The first preferred embodiment of this invention, included in modulator 110 of FIG. 2, will be described in conjunction with the flow charts of FIGS. 3 and 4 and the graphs of FIGS. 5 and 6. This preferred embodiment of this invention is implemented as a programmed microprocessor. The presently preferred microprocessor is a Z-80 CPU manufactured by Zilog, Inc., Cupertino, Calif. The program is presented in flow chart form in FIGS. 3 and 4 and is listed in assembly language form in Tables 1-4.

This program is executed periodically (203 times each second in the preferred embodiment) to generate a modulated brake control signal. This modulated brake control signal is then added to signals produced by the transient control unit 120 and the lead network 130, and the resulting signal is used to control the valve driver 150.

As mentioned earlier, the improved modulator of this invention can be used with a wide variety of brake control systems. This preferred embodiment utilizes two dynamic variables generated by the remainder of the brake control system.

First, this preferred embodiment accepts as an input the most recent measurement of wheel velocity, which is labelled VELOC1 in the listings. In this embodiment, VELOC1 is updated 203 times per second by the wheel speed determination unit 80.

Second, this embodiment accepts as an input the error velocity signal generated by the error velocity determination unit 100. This signal is labelled ERROR in the listings and $V_{ERR}$ in the flowcharts. Here, ERROR corresponds generally to the algebraic difference between the reference velocity, as determined by the reference velocity determination unit 90, and the instantaneous wheel speed, as determined by the wheel speed determination unit 80. Thus, ERROR 90 provides an indication of the slip velocity of the braked wheel 30.

As a preliminary matter, it should be noted that the modulator of this first embodiment produces a modulated control signal which corresponds generally to the average level of brake pressure applied to the brake 20. Thus, a high modulator output corresponds to a high coefficient of friction between the wheel 30 and the pavement. In practice the anti-skid valve 70 is generally designed to require a large current to bring about a large reduction in brake pressure, and therefore the driver 150 is designed to invert the signal from the summing device 140 prior to amplification to obtain the desired relationship between the modulated control signal and the valve control signal.

Figure 4:
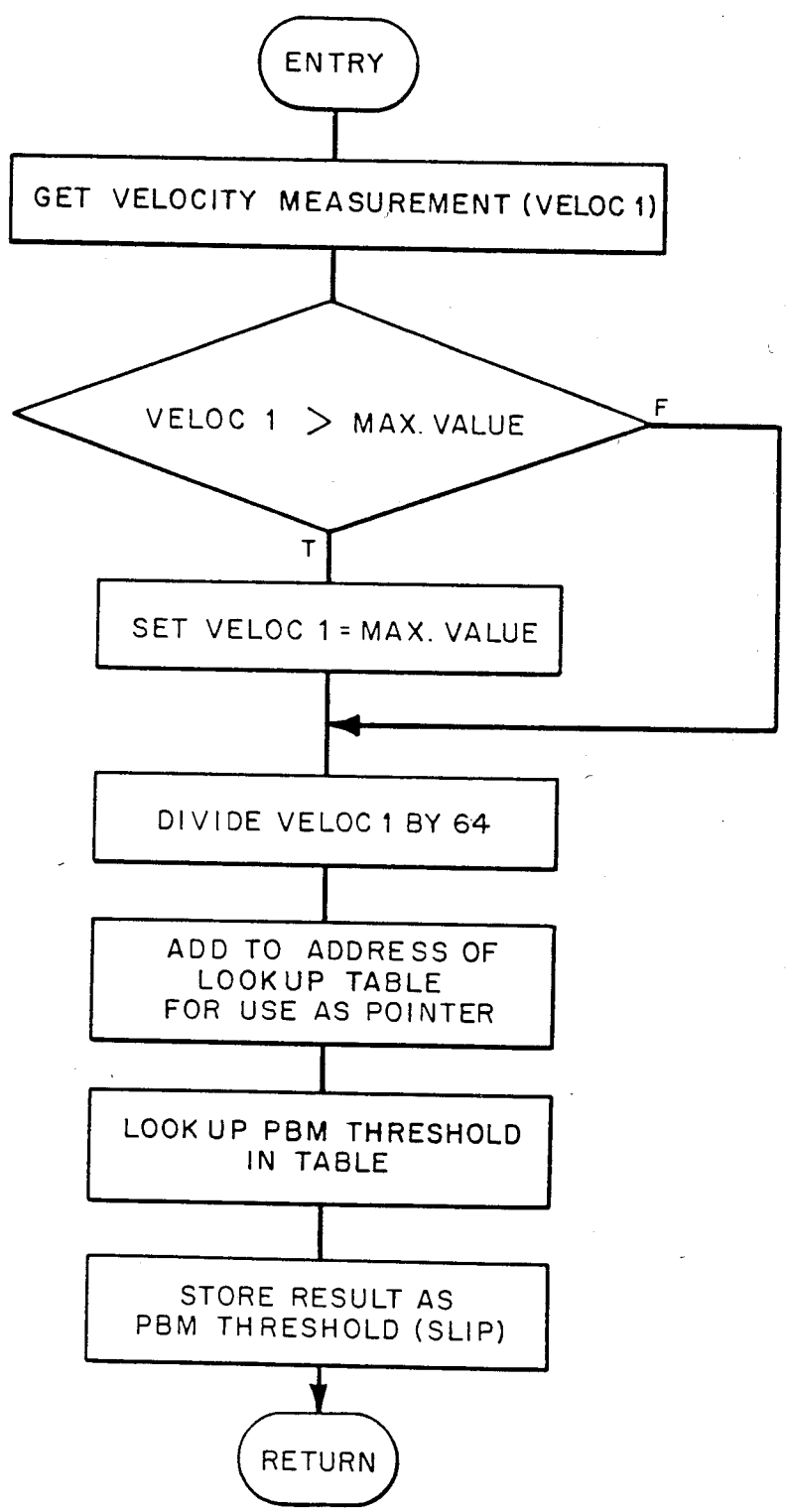
FIG. 4 is a flowchart of a second portion of the first preferred embodiment of the PBM determination unit of FIG. 2.

Turning now to FIG. 3, the preferred embodiment of the improved modulator of this invention accepts as an input the error velocity signal ERROR and the wheel velocity signal VELOC1 as described above, and generates a modulated brake control signal in response to these two dynamic variables. As shown in FIG. 3, the first step in the program is to obtain the current error velocity. The VELOC1 velocity is used in the program flow charted in FIG. 4 to obtain the instantaneous threshold signal. As shown in FIG. 4, this is done by first obtaining the most recent wheel speed velocity measurement (VELOC1) and clamping VELOC1 to a maximum velocity if it exceeds that maximum velocity. Then the clamped VELOC1 is divided by 64 and the resulting value added to the beginning address of a look-up table. This look-up table is listed in Table 3, and it contains a plurality of threshold values. Depending on the instantaneous value of the pointer obtained from VELOC1, one of this plurality of threshold values is selected as the instantaneous threshold signal and stored in the variable SLIP.

Returning to FIG. 3, the program then adds the error velocity signal to the threshold signal and branches according to the sign and magnitude of the resulting sum. If the resulting sum is positive the program then selects one of five positive rate values in accordance with the size of the summation value. The selected rate is then added to the modulated control signal and the resulting sum is checked for overflow. If overflow has occurred, the modulated brake control signal is set to a maximum value.

Figure 6:
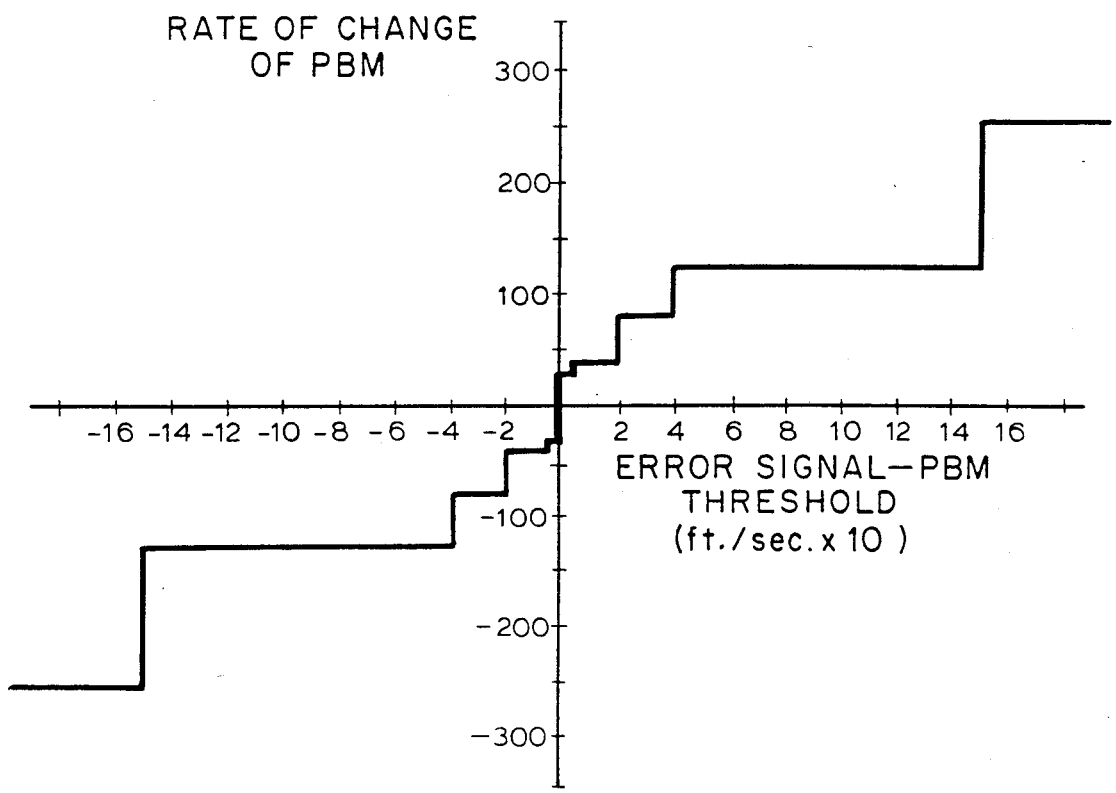
FIG. 6 is a graph showing the functional relationship between the PBM rate and the sum of the error signal and the threshold signal in the first preferred embodiment of FIGS. 3 and 4.

If, on the other hand, the sum of the error velocity signal and the threshold signal is negative, the resulting sum is compared with negative thresholds corresponding in magnitude to the four positive threshold values discussed above. Depending on the negative magnitude of the sum, one of five possible negative rate signals is chosen and the negative rate signal is then added to the modulated brake control signal, as shown in FIG. 6. Again, the resulting sum is checked for overflow and set to zero if overflow is sensed. Finally, the modulated brake control signal is clamped to a minimum value and the clamped result is saved as the new modulated brake control signal.

FIG. 6 presents in graphical form the information of Tables 1-4 relating to the non-linear function used to generate the rate signal. In FIG. 6, the x-axis is used to designate the difference between the error signal and the modulator threshold. This difference is in effect the input signal into the rate signal generating means. The y-axis is used to designate the modulator rate signal generated in response to various input signals. As shown in FIG. 6, the rate signal is a non-linear function of the input signal. This non-linear function (1) provides a large discontinuity at the point where the input signal equals zero, (2) is symmetrical about the origin, and (3) provides a rate signal which is proportionally greater for small values of the input signal than for large values of the input signal.

Figure 5:
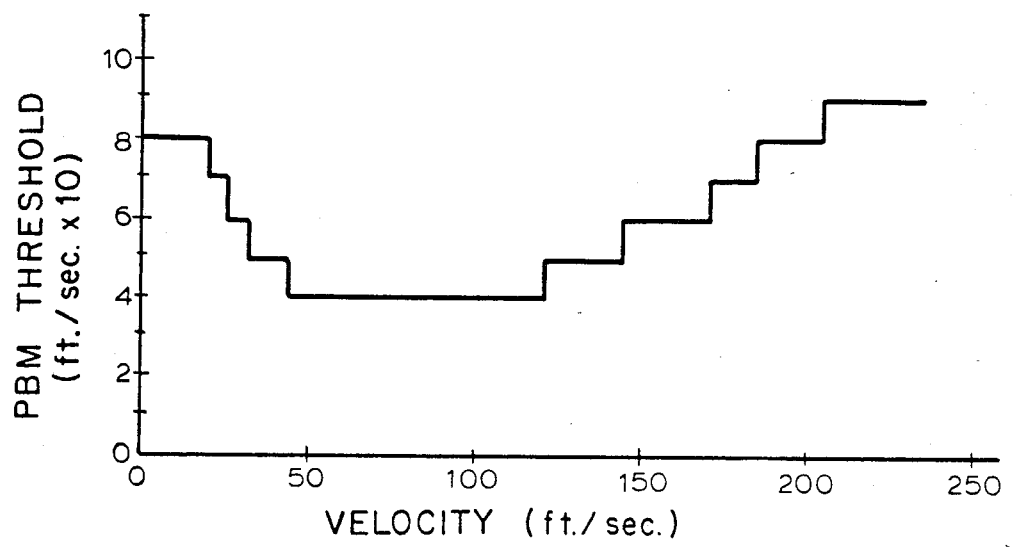
FIG. 5 is a graph showing the functional relationship between the PBM threshold and wheel velocity in the first preferred embodiment of FIGS. 3 and 4.

From the foregoing, it should be apparent that the disclosed program of FIGS. 3 and 4 operates to generate a modulated brake control signal in response to an error velocity input signal and a wheel speed signal supplied by the remainder of the anti-skid system. One important feature of this preferred embodiment is that the threshold signal varies as a function of wheel velocity. The relationship between these two variables is graphically depicted in FIG. 5. In FIG. 5 it can be seen that a low threshold of four-tenths of a foot per second is used for wheel velocities in the range of about 50 to about 120 feet per second. For wheel velocities either higher or lower than this range higher threshold signals are used.

This variable threshold feature of the invention provides significant advantages in that the braking aggressiveness of the anti-skid system can be individually chosen for various wheel velocities. The curve of the FIG. 5 has been obtained through computer simulations. The approach used was to start with a uniformly low threshold signal and to raise the threshold signal in separate velocity ranges to the point where wheel skids became excessive in number. Preferably, ground force during a computer simulated braking run is evaluated as a function of wheel velocity. If ground force supplied by the braking system becomes lower than optimum and the skid activity is not excessive, then the threshold for that velocity region can be raised. In this way, the braking aggressiveness of the modulator can be tailored to individual conditions and the need to compromise braking efficiency at one speed to obtain improved braking efficiency at another speed is eliminated.

A second feature of this embodiment is that the velocity measurement VELOC1 is clamped to a maximum value before it is used as a pointer for table look-up purposes. This provides a fail safe feature in that a threshold value is obtained from the table even in the event of a malfunction causing the velocity measurement to read erroneously high. The table shown in Table 3 includes 37 distinct threshold values. In some applications it may be preferable to use a shorter table having half the resolution and approximately half the length of Table 3, thereby reducing memory requirements.

By way of explanation, Table 3 stores threshold values in units of tenths of feet per second. For example, the first entry in Table 3 reads BYTE 8. This indicates that the decimal number 8 is to be stored as the first entry in the table, and this entry corresponds to eight-tenths of a foot per second threshold velocity. The second column in the table reproduced in Table 3 indicates the range of velocities measured in feet per second which correspond to the individual entries of the table. The variables VELOC1 and ERROR are sixteen bit variables scaled to one-tenth of a foot per second per least significant bit. Additionally, the variable PBM is directly related to brake pressure and inversely related to valve current. The relationship is linear such that full scale valve current corresponds to a PBM value of 1280 (hexadecimal) and zero valve current corresponds to a PBM value of 7FFF (hexadecimal).

SECOND PREFERRED EMBODIMENT

Figure 7:
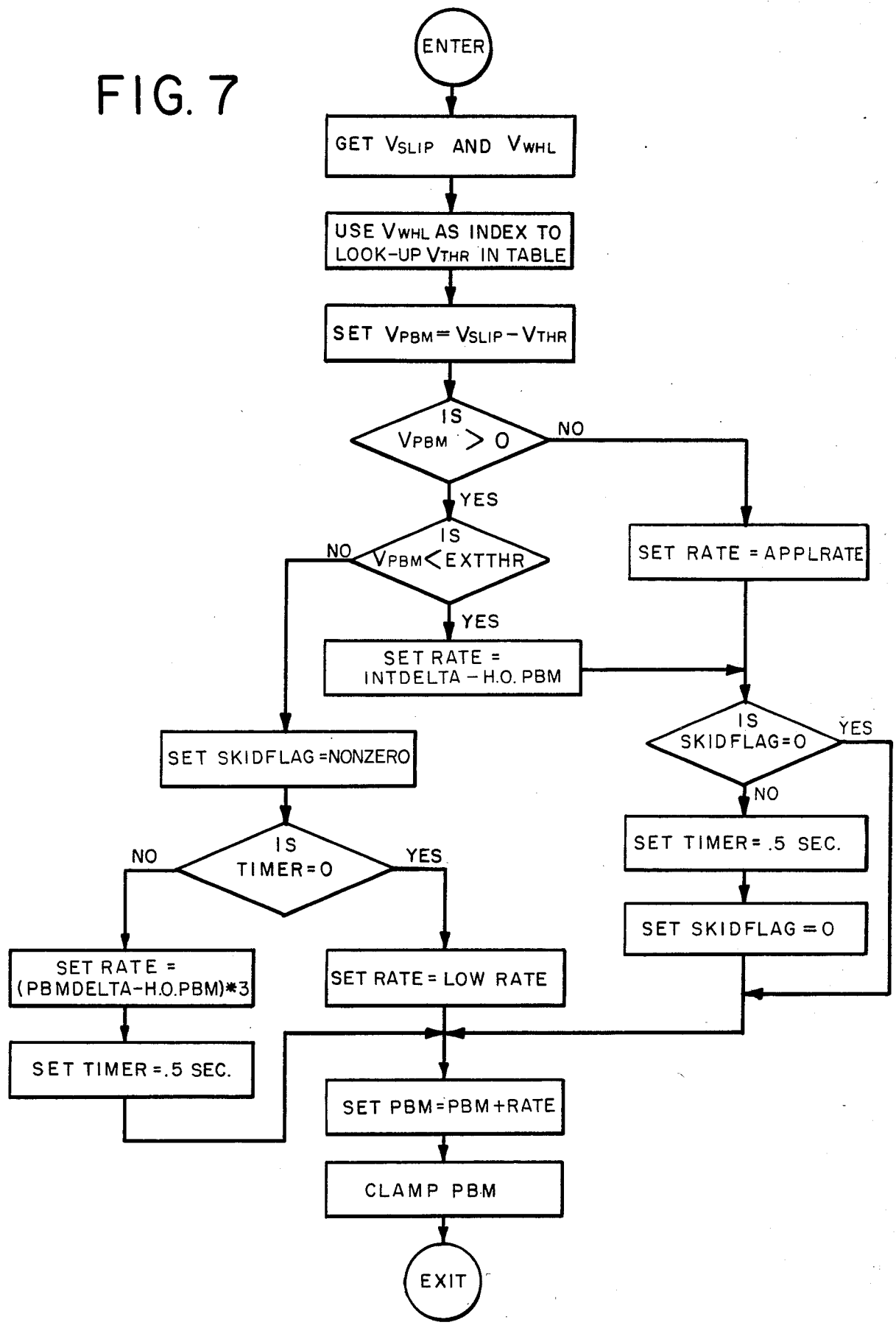
FIG. 7 is a flowchart of a second preferred embodiment of a portion of the PBM determination unit of FIG. 2.
Figure 8:
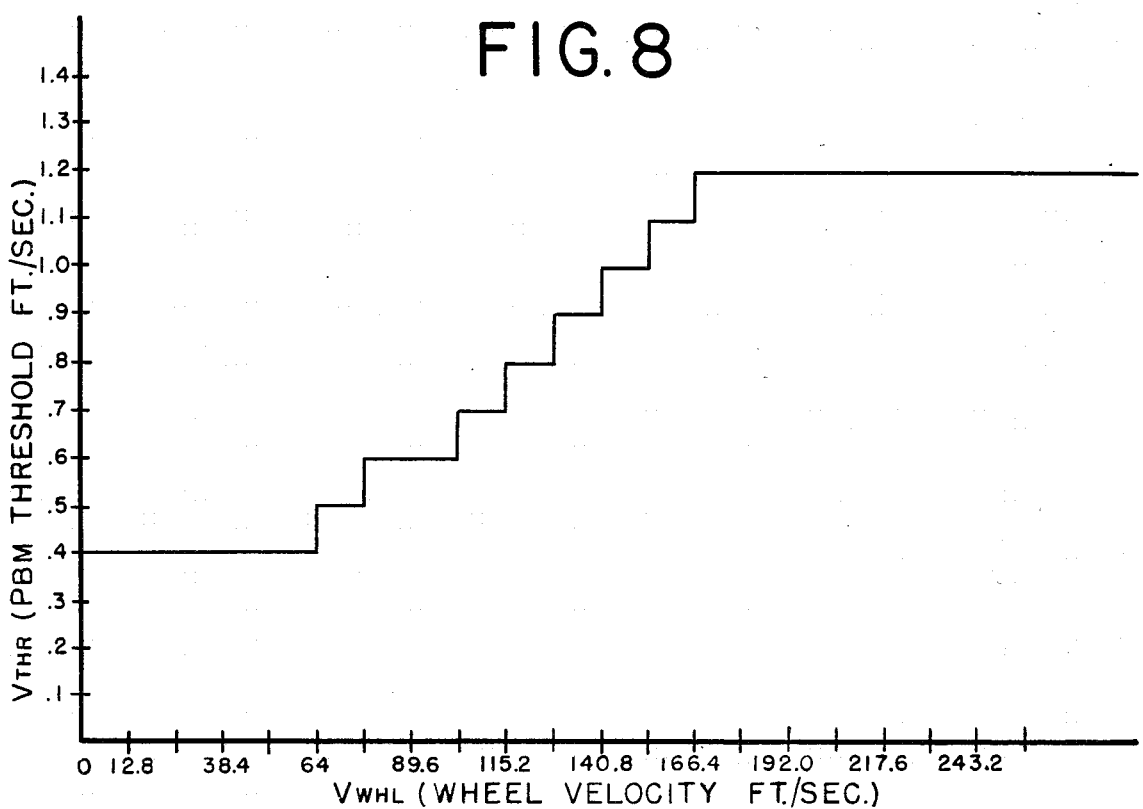
FIG. 8 is a graph showing the functional relationship between the PBM threshold and wheel velocity in the second preferred embodiment of FIG. 7.
Figure 9:
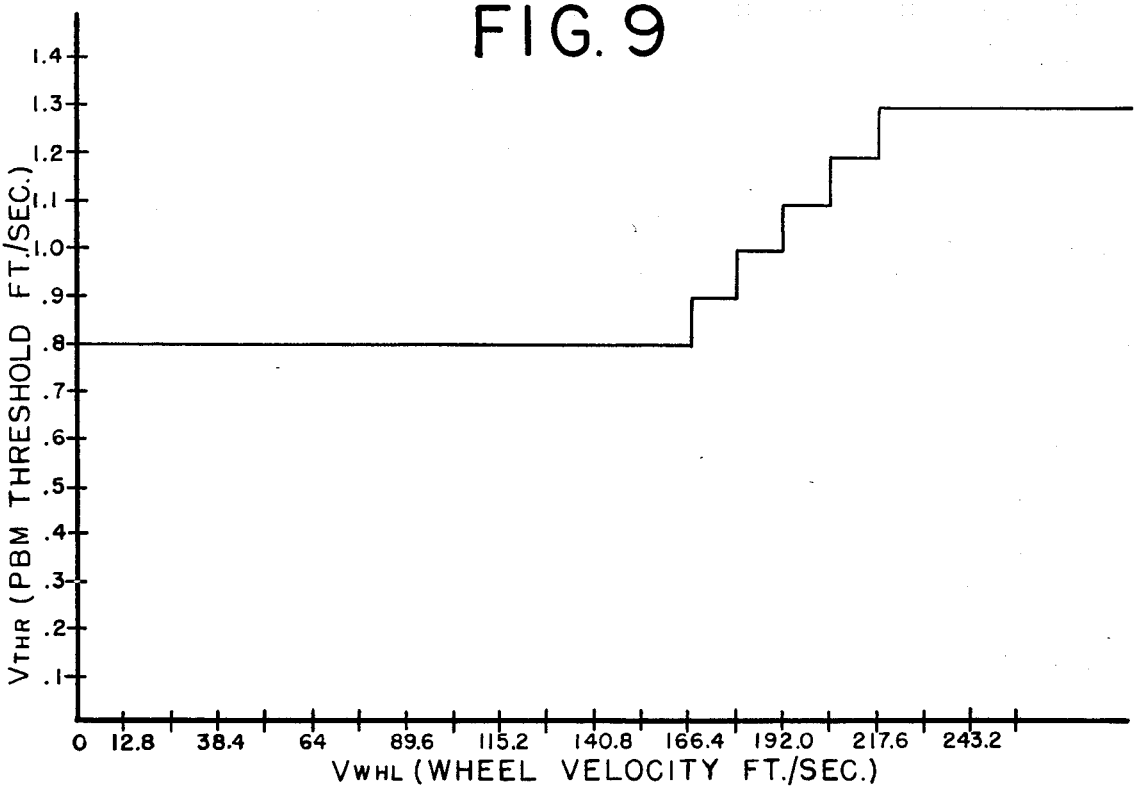
FIG. 9 is a graph showing the functional relationship between the PBM threshold and wheel velocity in a third preferred embodiment of this invention.

Turning now to FIGS. 7-9 and Tables 5a, 5b, 5c, and 6, a second preferred embodiment of the improved modulator of this invention is in some ways similar to the first preferred embodiment discussed above in connection with FIGS. 3-6 and Tables 1-4. As before, this modulator generates a modulated brake control signal which is added to the signals produced by the transient control unit 120 and the lead network 130, and the resulting signal is used to control the valve driver 150. The second preferred embodiment also comprises a programmed Z-80 microprocessor, and the relevant portions of the program of this second embodiment are listed in Tables 5a, 5b and 5c. The program of Table 5a is flowcharted in FIG. 7. Throughout, the listings are to be taken as the primary disclosure and the flowcharts and the following discussion are intended to clarity the listing.

The program of FIG. 7 and Table 5a receives two variables as inputs from the remainder of the brake control system, $V_{SLIP}$ and $V_{WHL}$. $V_{SLIP}$ is essentially equal to the difference between the most recent measured velocity of the braked wheel controlled by the anti-skid system and the most recently generated reference velocity. Thus, $V_{SLIP}$ is indicative of the current estimate of the slip velocity of the braked wheel. $V_{WHL}$ is the most recent measured velocity of the braked wheel, filtered if necessary. Both $V_{SLIP}$ and $V_{WHL}$ in this embodiment are 16 bit variables scaled to 0.1 foot per second at the least significant bit. The anti-skid system used with this embodiment provides a new measurement of wheel speed every 5 milliseconds and the program of FIG. 7 is preferably executed every 5 milliseconds.

The program of FIG. 7 and Table 5a responds to $V_{SLIP}$ and $V_{WHL}$ to generate a variable RATE which is summed with a variable PBM. The variable PBM is thus a time integral function of the variable RATE, and PBM is used in the anti-skid system described above as a modulated brake control signal. PBM is a 16 bit variable which is clamped to the range between zero and ODOO(HEX). Thus, the high order byte of PBM (called H.O.PBM in FIG. 7) ranges in value between 0 and 13. PBM is correlated linearly with the valve current associated with the modulated brake control signal such that a PBM value of zero corresponds to zero valve current, and a PBM value of ODOO(HEX) corresponds to maximum value current (45 milliamps in this embodiment).

Turning now to FIG. 7, this second preferred embodiment begins with the variables $V_{SLIP}$ and $V_{WHL}$ explained above. In the listing of Table 5a, $V_{SLIP}$ is initially stored in the register BC and $V_{WHL}$ is stored as the variable FILTRVEL. $V_{WHL}$ is then used as an index to look up one of the entries of the table SLIPTABL of Table 5b, which corresponds to $V_{THR}$ of FIG. 7. FIG. 8 shows in graphical form the manner in which $V_{THR}$ varies as a function of $V_{WHL}$ such that $V_{THR}$ is set to a respective constant value when $V_{WHL}$ is in one of the two ranges 0-64 ft/sec and 166-300 ft/sec, and $V_{THR}$ gradually increases in the range 64-166 ft/sec. $V_{PBM}$, which is set equal to $V_{SLIP}-V_{THR}$, is used as a measure of the severity of wheel slip. The value of $V_{PBM}$ is classified into one of three ranges, and the modulator variable PBM is adjusted in accordance with this classification, as shown in Table 6.

If $V_{PBM}$ is less than zero (an indication of less than maximum available braking action) then the variable RATE is set equal to a constant negative value (APPLRATE in Table 5a). When RATE is added to PBM, PBM is decreased, thereby tending to reduce valve current and to increase braking action.

If $V_{PBM}$ is greater than zero but less than a preset level EXTTHR (an indication of a moderate degree of wheel slip), RATE is set equal to INTDELTA-H.O.PBM. In the embodiment of Table 5a, INTDELTA is a constant equal to 13; as explained above, H.O.PBM is the high order byte of PBM, and it ranges between 0 and 13. Thus, in this branch of the program, RATE is set to a value between 0 and 13 in inverse relation to the value of PBM. When PBM is low, indicating that the value current is low and the coefficient of friction between the support surface and the tire of the braked wheel is high, then RATE is set to a relatively high value; conversely, when PBM is high, indicating a low coefficient of friction, RATE is set to a lower value. In this way RATE is determined as appropriate for instantaneous braking conditions.

If $V_{PBM}$ is greater than EXTTHR (an indication of a more severe wheel skid) the program of FIG. 7 sets RATE in accordance with the recent skid history of the braked wheel. If this is the first more severe wheel skid in more than 0.5 second, then RATE is set to a constant, positive value (LOWRATE in Tables 5a, 5b). If less than 0.5 second has elapsed between this and the most recent previous value of $V_{PBM}$ greater than EXTTHR, then RATE is set equal to 3(PBMDELTA-H.O.PBM). As shown in Table 5b, LOWRATE is equal to 8 and PBMDELTA is equal to 14 in this embodiment. Thus, in this branch of the program, RATE is set equal to 8 for the first more severe skid in 0.5 second or more, and RATE is set to a value in the range of 3 to 52 (depending on the value of PBM) for more severe skids occurring with a frequency greater than 2 Hz.

In Table 5a, TIMER9 is a timer which is automatically decremented to zero (but no farther) on a regular basis by a conventional subroutine (not shown); 5*SECOND/10 is a constant which yields a 0.5 second delay between the time it is loaded into TIMER9 and the time TIMER9 is next decremented to zero; SKIDFLAG is a variable that is set and reset by the program of Table 5a to keep track of the status of TIMER9.

Table 6 presents the values of RATE for three different values of H.O.PBM, and this table should be referenced for a more detailed understanding of the program of Table 5a and FIG. 7. At extremely high values of H.O.PBM, LOWRATE is actually somewhat greater than 3(PBMDELTA-H.O.PBM). This does not present a problem in the particular application for which this embodiment was designed; however, if it is desired to avoid this situation, LOWRATE can readily be made to vary inversely with H.O.PBM.

Once RATE has been set as described above the variable PBM is set equal to the old value of PBM plus RATE. The routine CLAMPX of Table 5c is used to maintain PBM in the range of zero to 3328 (ODOO(HEX)). The revised value of PBM is then supplied to the remainder of the brake control system as a modulated brake control signal.

In general, the various constants should be tailored to individual applications. For example, it is generally best to set APPLRATE to the largest value which does not produce excessive wheel skids. LOWRATE should be set to provide a slight reduction in braking torque after a typical surface irregularity (such as a tarstrip) has been passed. PBMDELTA and INTDELTA should be set to achieve the desired values of RATE as a function of the currently prevailing braking coefficient.

The program of FIG. 7 and Tables 5a, 5b, 5c provides a number of important advantages. First, the variable threshold $V_{THR}$ for the modulator allows the modulator to be adjusted for effective brake control for the particular vehicle and braked wheel of any given application. The values of Table 5b and FIG. 8 were selected after actual testing to provide a modulator tailored to a particular aircraft. Note that the graph of FIG. 8 differs from that of Table 5 (discussed above in connection with the first preferred embodiment) in that the graph of FIG. 8 does not slope downwardly at low velocities. The thresholds of FIG. 8 are believed to differ from FIG. 5 in that the brake used in the testing which resulted in the thresholds of FIG. 8 exhibited a greater degree of low velocity torque peaking than did the brake assumed in the simulation which resulted in the curve of FIG. 5.

FIG. 9 shows an alternate function for $V_{THR}$ which has been found useful in simulation of a third type of aircraft braking system. In the embodiment of FIG. 9, it was determined that the modulator contributed to effective braking by maintaining $V_{THR}$ at a higher level at lower velocities.

From these examples, it should be apparent that the variable threshold aspect of the invention is not limited to the particular thresholds illustrated. To the contrary, the thresholds used in any particular application will generally be tailored as described above in connection with the first preferred embodiment to provide effective brake control for the particular brake and vehicle characteristics of the braking system being controlled. Furthermore, the variable threshold feature of this invention is not limited to use in modulators that determine the modulator rate in the manner described above; this feature of the invention can be used with the widest range of modulators, including those which determine the modulator rate in a conventional manner as well as acceleration based modulators.

A second advantage of this invention is the manner in which the disclosed modulator reacts to a more severe skid in a manner appropriate to the frequency with which more severe skids have recently occurred. As described above, the disclosed modulator increases PBM by a relatively small amount for the first more severe skid in a specified time, but it increases PBM by a much larger amount when PBM is low and more severe skids occur frequently. This feature of the invention provides important advantages, for it allows the modulator to discriminate between two very different situations. In the first situation, an isolated more severe skid (such as that caused by a localized surface irregularity such as a tar strip in a runway) is not indicative of excessive braking such as that necessitating a major change in the level of the modulated brake control signal. In the second situation, a pattern of recurring more severe skids (such as those caused by a general reduction in the coefficient of friction between the tire and runway). indicates that major adjustment of the modulated brake control signal may in fact be needed.

The disclosed modulator responds differently to these two situations, in a manner appropriate to each. Isolated more severe skids do not cause a major increase in PBM, and local runway features such as tar strips do not cause the modulator to reduce the braking action excessively. On the other hand, the modulator responds to high frequency skids by increasing PBM at a high rate for low values of PBM, thereby rapidly bringing the modulated brake control signal to a level appropriate to the new value of the coefficient of friction.

This second feature of the invention is of widespread utility in a range of modulators, including those responsive to wheel acceleration rather than velocity. Furthermore, this feature of the invention can be used in modulators which do not embody the first feature of the invention, but instead use conventional, fixed thresholds.

A third important advantage of the modulator disclosed above is that it uses a combination of fixed and PBM dependent rates to generate a rate appropriate to the particular braking situation. It has been found that a particularly effective modulator can be provided for some applications by using a constant rate when the modulated brake signal is to be reduced, and by using respective PBM dependent rates in response to less severe skids and repeated more severe skids.

Of course, it should be understood that various changes and modifications to the preferred embodiments described above will be apparent to those skilled in the art. For example, the invention can be used with acceleration based as well as velocity based modulators. In addition, the correspondence between wheel velocity and threshold, as well as other stored constants, can be chosen to fit other applications. The invention can be embodied in analog as well as digital forms; and other signals generally indicative of wheel speed, such as the reference velocity generated by the reference velocity determination unit 90, for example, can be used in place of the wheel speed signal to select the threshold signal. It is therefore intended that the foregoing description be regarded as illustrative rather than limiting, and that it be understood that it is the following claims, including all equivalents, which are intended to define the scope of the invention.

TABLE 1

```
;      PBM FUNCTION
;      *****************
;
PBMX   LD HL, (ERROR)
       LD D,O
       LD E,(IY+SLIP-RAM); PBM THRESHOLD VALUE
       ADD HL,DE
       EX DE,HL
       BIT 7,D
       JR NZ,PBMA; JUMP IF NEG (REF VELOCITY)
       LD HL,PBMTHR1; POSITIVE THRESHOLD 1
       XOR A
       SBC HL,DE
       JR C,PBMB
       LD HL,PBMRTE1; POSITIVE RATE 1
       JR PBMC
PBMB   LD HL,PBMTHR2; THRESHOLD 2
       XOR A
       SBC HL,DE
       JR C,PBMD
       LD HL,PBMRTE2; RATE 2
       JR PBMC
PBMD   LD HL,PBMTHR3; THRESHOLD 3
       XOR A
       SBC HL,DE
       JR C,PBMI
       LD HL,PBMRTE3; RATE 3
       JR PBMC
PBMI   LD HL,PBMTHR4; THRESHOLD 4
       XOR A
       SBC HL,DE
       JR C,PBMJ
       LD HL,PBMRTE4; RATE 4
       JR PBMC
PBMJ   LD HL,PBMRTE5; THRESHOLD 5
PBMC   LD DE,(PBM)
       ADD HL,DE
       BIT 7,H; CHECK FOR OVERFLOW
       JR Z,PBME
       LD HL,7FFFH; CLAMP TO MAX
       JR PBME
PBMA   LD HL,-PBMTHR1; NEGATIVE THRESHOLD 1
       XOR A
       SBC HL,DE
       JR NC,PBMF
       LD HL,-PBMRTE1; NEGATIVE RATE 1
       JR PBMG
PBMF   LD HL,-PBMTHR2; THRESHOLD 2
       XOR A
       SBC HL,DE
       JR NC,PBMH
       LD HL,-PBMRTE2; RATE 2
       JR PBMG
PBMH   LD HL,-PBMTHR3
       XOR A
       SBC HL,DE
       JR NC,PBMK
       LD HL,-PBMRTE3
       JR PBMG
PBMK   LD HL,-PBMTHR4
       XOR A
       SBC HL,DE
```

TABLE 1-continued

```
;           PBM FUNCTION
;           ****************
            JR   NC,PBML
            LD   HL,-PBMRTE4
            JR   PBMG
PBML        LD   HL,-PBMRTE5
PBMG        LD   DE,(PBM)
            ADD  HL,DE
            BIT  7,H; CHECK FOR OVERFLOW
            JR   Z,PBME
            LD   HL,0; CLAMP TO MIN VALUE
PBME        EX   DE,HL
            LD   HL,MAXPBM; PBM CLAMP VALUE
            XOR  A
            SBC  HL,DE
            JR   C,PBMM; VALUE GOOD, JUMP
            LD   DE,MAXPBM
PBMM        LD   (PBM),DE
            SRL  D
            RR   E
            SRL  D
            RR   E
            SRL  D
            RR   E
            LD   B,D
            LD   C,E; SAVE SUM IN "BC"
;
```

TABLE 2

```
;
;           PBM THRESHOLD GENERATION
;           **************************************
;
            LD   HL,(VELOC1)
            LD   A,H
            CP   MAXVEL/256
            JR   C,TORQA
            LD   HL,MAXVEL
TORQA       SLA  L
            RL   H
            SLA  L
            RL   H; MULTIPLY BY 4
            LD   L,H
            LD   H,0; DIVIDE BY 256
            LD   DE,TABLE2
            ADD  HL,DE
            LD   A,(HL)
            LD   (SLIP),A; SAVE THRESHOLD VALUE
```

TABLE 3

|  | VARIABLE PBM THRESHOLD LOOK UP TABLE | |
|---|---|---|
|  | ************************************ | |
|  | THRESHOLD (FT/SEC×10) | VELOCITY (FT/SEC) |
| TABLE2 | BYTE 8; | 0-6.3 |
|  | BYTE 8; | 12.7 |
|  | BYTE 8; | 19.1 |
|  | BYTE 7; | 25.5 |
|  | BYTE 6; | 31.9 |
|  | BYTE 5; | 38.3 |
|  | BYTE 5; | 44.7 |
|  | BYTE 4; | 51.1 |
|  | BYTE 4; | 57.5 |
|  | BYTE 4; | 63.9 |
|  | BYTE 4; | 70.3 |
|  | BYTE 4; | 76.7 |
|  | BYTE 4; | 83.1 |
|  | BYTE 4; | 89.5 |
|  | BYTE 4; | 95.4 |
|  | BYTE 4; | 102.3 |

TABLE 3-continued

|  | VARIABLE PBM THRESHOLD LOOK UP TABLE | |
|---|---|---|
|  | ******************************** | |
|  | THRESHOLD (FT/SEC×10) | VELOCITY (FT/SEC) |
|  | BYTE 4; | 108.7 |
|  | BYTE 4; | 115.1 |
|  | BYTE 4; | 121.5 |
|  | BYTE 5; | 127.9 |
|  | BYTE 5; | 134.3 |
|  | BYTE 5; | 140.7 |
|  | BYTE 5; | 147.1 |
|  | BYTE 6; | 153.5 |
|  | BYTE 6; | 159.9 |
|  | BYTE 6; | 166.3 |
|  | BYTE 6; | 172.7 |
|  | BYTE 7; | 179.1 |
|  | BYTE 7; | 185.5 |
|  | BYTE 8; | 191.9 |
|  | BYTE 8; | 198.3 |
|  | BYTE 8; | 204.7 |
|  | BYTE 9; | 211.1 |
|  | BYTE 9; | 217.5 |
|  | BYTE 9; | 223.9 |
|  | BYTE 9; | 230.3 |
|  | BYTE 9; | 236.7 |

TABLE 4

```
;       *******
;       *     *
;       *RAM *
;       *     *
;       *******
ERROR    EQU 815H; ERROR VALUE FOR CONTROL
                 (TWO BYTES)
PBM      EQU 80AH; PBM VALUE (TWO BYTES)
SLIP     EQU 819H; SLIP VELOCITY VALUE
                 (ONE BYTE)
VELOC1   EQU 820H; NEW VELOCITY
;
;
;       ***************************
;       *                         *
;       * GENERAL CONSTANTS *
;       *                         *
;       ***************************
MAXVEL   EQU 2304; 230.4 FT/SEC VELOCITY
                 CLAMP FOR PBM THRESHOLD
MAXPBM   EQU 4736; MAX PBM CLAMP
                 (SET AT 55 MA-47 MA = 8 MA)
PBMTHR1  EQU 4; THRESHOLD 1 (.4 FT/SEC)
PBMTHR2  EQU 20; THRESHOLD 2 (2 FT/SEC)
PBMTHR3  EQU 40; THRESHOLD 3 (4 FT/SEC)
PBMTHR4  EQU 150; THRESHOLD 4 (15 FT/SEC)
PBMRTE1  EQU 32; RATE 1
PBMRTE2  EQU 40
PBMRTE3  EQU 80
PBMRTE4  EQU 128
PBMRTE5  EQU 256
;
```

TABLE 5a

```
            LD   HL,(FILTRVEL)
            ADD  HL,HL
            LD   L,H
            LD   H,0
            LD   A,19
            CP   L
            JR   NC,WHLCNTC
            LD   L,A
```

TABLE 5a-continued

| | |
|---|---|
| WHLCNTC | LD DE,SLIPTABL |
| | ADD HL,DE |
| | LD L,(HL) |
| | LD H,OFFH |
| | ADD HL,BC |
| | LD DE,APPLRATE |
| | LD A,(PBM+1) |
| | LD B,A |
| | BIT 7,H |
| | JR NZ,WHLCNTE |
| | LD DE,-EXTTHR |
| | ADD HL,DE |
| | LD DE,EXTRATE |
| | JR C,WHLCNTE |
| | CP INTCLAMP |
| | JR C,WHLCNTD |
| | LD A,INTCLAMP |
| WHLCNTD | LL B,A |
| | LD A,INTDELTA |
| | SUB B |
| | LD E,A |
| WHLCNTE | LD A,E |
| | LD HL,SKIDFLAG |
| | CP EXTRATE |
| | JR NZ,WHLCNTH |
| | LD (HL),5*SECOND/10 |
| | LD A,(TIMER9) |
| | OR A |
| | LD E,LOWRATE |
| | JR Z,WHLCNTF |
| | LD A,5*SECOND/10 |
| | LD (TIMER9),A |
| | LD A,PBMDELTA |
| | SUB B |
| | LD B,A |
| | ADD A,A |
| | ADD A,B |
| | LD E,A |
| | JR WHLCNTF |
| WHLCNTH | LD A,(HL) |
| | OR A |
| | JR Z,WHLCNTF |
| | LD (TIMER9),A |
| | LD (HL),0 |
| WHLCNTF | LL HL,(PBM) |
| | ADD HL,DE |
| | LD DE,MAXPBM |
| | CALL CLAMPX |
| | LD (PBM),HL |
| WHLCNTZ | RET |

TABLE 5b

| | | THRESHOLD (FT/SECX10) | VALID FOR VEL RANGE (FT/SEC) |
|---|---|---|---|
| SLIPTBL | BYTE | −4 ; | 0.0–12.7 |
| | BYTE | −4 ; | 12.8–25.5 |
| | BYTE | −4 ; | 25.6–38.3 |
| | BYTE | −4 ; | 38.4–51.1 |
| | BYTE | −4 ; | 51.2–63.9 |
| | BYTE | −5 ; | 64.0–76.7 |
| | BYTE | −6 ; | 76.8–89.5 |
| | BYTE | −6 ; | 89.6–102.3 |
| | BYTE | −7 ; | 102.4–115.1 |
| | BYTE | −8 ; | 115.2–127.9 |
| | BYTE | −9 ; | 128.0–140.7 |
| | BYTE | −10 ; | 140.8–153.5 |
| | BYTE | −11 ; | 153.6–166.3 |
| | BYTE | −12 ; | 166.4–179.1 |
| | BYTE | −12 ; | 179.2–191.9 |
| | BYTE | −12 ; | 192.0–204.7 |
| | BYTE | −12 ; | 204.8–217.5 |
| | BYTE | −12 ; | 217.6–230.3 |
| | BYTE | −12 ; | 230.4–243.1 |
| | BYTE | −12 ; | 243.2–LIMIT |
| MAXPBM | EQU 3328 | | |
| EXTRATE | EQU 7FH | | |
| LOWRATE | EQU 8 | | |

TABLE 5b-continued

| | | THRESHOLD (FT/SECX10) | VALID FOR VEL RANGE (FT/SEC) |
|---|---|---|---|
| PBMDELTA | EQU OEH | | |
| APPLRATE | EQU −3 | | |
| EXTTHR | EQU 128 | | |
| INTCLAMP | EQU 10 | | |
| INTDELTA | EQU 13 | | |

TABLE 5c

| | |
|---|---|
| CLAMPX | BIT 7,H |
| | JR Z,CLAMP1 |
| | LD HL,0 |
| | JR CLAMPZ |
| CLAMP1 | CP A |
| | SBC HL,DE |
| | ADD HL,DE |
| | JR C,CLAMPZ |
| | EX DE,HL |
| CLAMPZ | RET |

TABLE 6

| | PBM RATE | | |
|---|---|---|---|
| | H.O.PBM=1 | H.O.PBM=5 | H.O.PBM=10 |
| $V_{PBM} < 0$ | −3 | −3 | −3 |
| $0 < V_{PBM} < 12.8$ | 12 | 8 | 3 |
| $V_{PBM} > 12.8$ | 8 | 8 | 8 |
| AND SKID FREQUENCY <2Hz | | | |
| $V_{PBM} > 12.8$ | 39 | 27 | 12 |
| AND SKID FREQUENCY >2Hz | | | |

I claim:

1. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; means, included in the modulator means, for generating a rate signal as a function of both the input signal and a threshold signal; means, included in the modulator means, for generating the modulated brake control system as a time integral function of the rate signal; and means, responsive to the modulated brake control signal, for modifying the action of the brake application means; the improvement comprising:

means, included in the modulator means, for generating the threshold signal as a function of a velocity signal generally indicative of the velocity of the braked wheel such that the threshold signal is generated at a substantially constant value in a first range of velocities and the threshold signal is generated as a substantially increasing function of the velocity signal in a second range of velocities.

2. The invention of claim 1 wherein the first range of velocities is about 0 feet per second to about 60 feet per second and the second range of velocities is about 60 feet per second to at least about 150 feet per second.

3. The invention of claim 1 wherein the first range of velocities is about 0 feet per second to about 150 feet per second and the second range of velocities is about 150 to at least about 200 feet per second.

4. In an anti-skid braking system for modifying the action of a brake application means for a braked wheel of a vehicle; said system including means for generating a wheel signal indicative of rotational velocity of the braked wheel; means, responsive to the wheel signal for generating an input signal indicative of a braking condition; modulator means, responsive to the input signal, for generating a modulated brake control signal; means, included in the modulator means, for generating a rate signal as a function of the sum of the input signal and a threshold signal; means, included in the modulator means, for generating the modulated brake control signal as a time integral function of the rate signal; and means, responsive to the modulated brake control signal, for modifying the action of the brake application means; the improvement comprising:

means, included in the modulator means and responsive to the wheel signal, for generating the threshold signal as a function of the wheel signal such that the threshold signal is generated at a substantially constant value in a first range of velocities and the threshold signal is generated at a substantially increasing function of the velocity signal in a second range of velocities.

5. The invention of claim 4 wherein the first range of velocities is about 0 feet per second to about 60 feet per second and the second range of velocities is about 60 feet per second to at least about 150 feet per second.

6. The invention of claim 4 wherein the first range of velocities is about 0 feet per second to about 150 feet per second and the second range of velocities is about 150 to at least about 200 feet per second.

7. In an anti-skid braking system for modifying the action of a brake application means for a braked wheel of a vehicle; said system including means for generating a wheel signal indicative of rotational velocity of the braked wheel; means, responsive to the wheel signal, for generating an input signal indicative of a braking condition; modulator means, responsive to the input signal, for generating a modulated brake control signal; means, included in the modulator means, for generating a rate signal as a function of an algebraic combination of a selected threshold signal and the input signal; means, included in the modulator means, for generating the modulated brake control signal as a time integral function of the rate signal; and means, responsive to the modulated brake control signal, for modifying the action of the brake application means; the improvement comprising:

a computer;

means, included in the computer, for storing a plurality of alternative threshold signals; and means, included in the computer, for selecting one of the plurality of alternative threshold signals in response to the amplitude of the wheel signal and for supplying the selected threshold signal to the rate generating means, said plurality of alternative threshold signals chosen such that at lower amplitudes of the wheel signal the selected threshold signal is substantially equal to a first value and at higher amplitudes of the wheel signal the selected threshold signal is greater in magnitude than the first value and increases in magnitude with higher amplitudes of the wheel signal, such that the selected threshold signal is matched to the vehicle and braked wheel to promote effective control of the action of the brake application means.

8. The invention of claim 4 or 6 or 7 wherein the input signal is an error signal indicative of slip velocity.

9. The invention of claim 7 wherein the plurality of alternative threshold signals are chosen such that the selected threshold signal is equal to the first value for amplitudes of the wheel signal corresponding to velocities in a range of about 0 to 150 feet per second and the selected threshold signal is greater in magnitude than the first value and generally increases in magnitude with the amplitude of the wheel signal for amplitudes of the wheel signal corresponding to velocities in a range of about 150 feet to at least about 200 feet per second.

10. The invention of claim 7 wherein the plurality of alternative threshold signals are chosen such that the selected threshold signal is equal to the first value for amplitudes of the wheel signal corresponding to velocities in a range of about 0 to about 50 feet per second and the selected threshold signal is greater in magnitude than the first value and generally increases in magnitude with the amplitude of the wheel signal for amplitudes of the wheel signal corresponding to velocities in a range of about 50 to at least about 150 feet per second.

11. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; and means, responsive to the modulated brake control signal, for modifying the action of the brake application means, the improvement comprising:

means, included in the modulator, for setting a rate signal to a first value when the input signal is indicative of a skid more severe than a first reference level and the elapsed time between consecutive values of the input signal indicative of wheel skids more severe than a second reference level is greater than a reference time;

means, included in the modulator, for setting the rate signal to a second value when the input signal is indicative of a skid more severe than the first reference level and the elapsed time between consecutive values of the input signal indicative of wheel skids more severe than the second reference level is less than the reference time; and means, included in the modulator means, for generating the modulated brake control signal as a time integral function of the rate signal.

12. The invention of claim 11 wherein the first reference level is equal to the second reference level.

13. The invention of claim 11 wherein the reference time is about one-half second.

14. The invention of claim 11 wherein the absolute value of the first value is less than that of the second value.

15. The invention of claim 11 or 14 wherein the first value is a constant value.

16. The invention of claim 11 or 14 wherein the second value is determined as a function of the amplitude of the modulated brake control signal.

17. In an antiskid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; and means, responsive to the modulated brake control signal, for modifying the action of the brake application means, the improvement comprising:

means, included in the modulator means and responsive to the input signal, for generating a detection signal when the value of the input signal is indicative of a wheel skid more severe than a reference level;

means, included in the modulator means and responsive to the detection signal, for generating a rate signal as a function of the frequency at which the detection signal is generated; and means, included in the modulator means and responsive to the rate signal, for generating the modulated brake control signal as a time integral function of the rate signal.

18. The invention of claim 17 wherein the rate generating means generates the rate signal at values corresponding to greater reductions in the action of the brake application means in response to a greater frequency of the detection signal and the rate generating means generates the rate signal at values corresponding to lesser reductions in the action of the brake application means in response to a lesser frequency of the detection signal.

19. The invention of claim 18 wherein the greater frequency is greater than about 2 Hz and the lesser frequency is less than about 2 Hz.

20. The invention of claim 17 wherein the input signal is indicative of an error velocity.

21. In an antiskid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; and means, responsive to the modulated brake control signal, for modifying the action of the brake application means, the improvement comprising:

means, included in the modulator means, for classifying each value of the input signal in one of at least first, second and third ranges;

means, included in the modulator means, for classifying the frequency with which values of the input signal are classified in the third range as greater or less than a reference frequency;

means, included in the modulator means, for setting a rate signal to a first value corresponding to decreased action of the brake application means when the input signal is in the first range;

means, included in the modulator means, for setting the rate signal to a second value corresponding to decreased action of the brake application means when the input signal is in the second range;

means, included in the modulator means, for setting the rate signal to a third value corresponding to decreased action of the brake application means when the input signal is in the third range and the frequency is less than the reference frequency;

means, included in the modulator means, for setting the rate signal to a fourth value corresponding to decreased action of the brake application means when the input signal is in the third range and the frequency is greater than the reference frequency; and means, included in the modulator means for generating the modulated brake control signal as a time integral function of the rate signal.

22. The invention of claim 21 wherein the third range corresponds to more excessive skids than the second range.

23. The invention of claim 21 wherein the reference frequency is about 2 Hz.

24. The invention of claim 21 wherein the first and third values correspond to respective predetermined constants and the second and fourth values are determined accordingly to respective functions of the modulated brake control signal.

25. The invention of claim 22 wherein the fourth value corresponds to a greater reduction in the action of the brake application means than does the third value.

26. The invention of claim 22 or 24 or 25 wherein the fourth value corresponds to a greater reduction in the action of the brake application means than does the second value.

* * * * *